US009720386B2

(12) United States Patent
Girardey

(10) Patent No.: US 9,720,386 B2
(45) Date of Patent: Aug. 1, 2017

(54) FIELD DEVICE FOR DETERMINING OR MONITORING A PHYSICAL OR CHEMICAL, PROCESS VARIABLE

(75) Inventor: Romuald Girardey, Huningue (FR)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 375 days.

(21) Appl. No.: 13/174,840

(22) Filed: Jul. 1, 2011

(65) Prior Publication Data

US 2012/0004860 A1  Jan. 5, 2012

Related U.S. Application Data

(60) Provisional application No. 61/344,438, filed on Jul. 22, 2010.

(30) Foreign Application Priority Data

Jul. 5, 2010 (DE) .................. 10 2010 030 953
Nov. 10, 2010 (DE) .................. 10 2010 043 706

(51) Int. Cl.
*G05B 9/03* (2006.01)
(52) U.S. Cl.
CPC ...... *G05B 9/03* (2013.01); *G05B 2219/25428* (2013.01)
(58) Field of Classification Search
CPC .................. G05B 9/03; G05B 2219/25428
(Continued)

(56) References Cited

U.S. PATENT DOCUMENTS 5,968,161 A * 10/1999 Southgate ................... 712/37
6,006,321 A * 12/1999 Abbott ....................... 712/43
(Continued)

FOREIGN PATENT DOCUMENTS

CN 102193512 A 9/2011
DE 20010739 6/2001
(Continued)

OTHER PUBLICATIONS

Josef Borcsok et al., "Implementation of a 1oo2-RISC-Architecture on FPGA for Safety Systems", IEEE, 2008, pp. 1046-1051.
(Continued)

*Primary Examiner* — Janet Suglo
(74) *Attorney, Agent, or Firm* — Bacon & Thomas, PLLC

(57) ABSTRACT

A field device for determining or monitoring a physical or chemical, process variable, comprising: a sensor, which works according to a defined measuring principle; and a control/evaluation unit. The control/evaluation unit is realized on a partially dynamically reconfigurable FPGA component, which is constructed from a plurality of FPGA blocks units. Each FPGA block unit comprises a plurality of logic blocks. Global resources or global function blocks are associated with each FPGA block unit or groups of FPGA block units. At least a first section and a second section are provided on the FPGA-component. The sections comprise FPGA block units and corresponding global resources global function blocks. In each section a digital measuring path comprising a plurality of software based and/or hardware based, function modules, is partially dynamically reconfigurable.

14 Claims, 6 Drawing Sheets

(58) Field of Classification Search
USPC .......................................................... 702/22
See application file for complete search history.

(56) References Cited

U.S. PATENT DOCUMENTS

| | | | |
|---|---|---|---|
| 6,816,810 B2* | 11/2004 | Henry et al. .................. | 702/179 |
| 6,993,442 B2* | 1/2006 | Kanevsky et al. ............. | 702/69 |
| 7,111,213 B1 | 9/2006 | Dastidar et al. | |
| 7,426,449 B2* | 9/2008 | Henry et al. .................. | 702/127 |
| 7,526,405 B2* | 4/2009 | Miller ........................... | 702/179 |
| 7,529,644 B2* | 5/2009 | Lenz et al. .................... | 702/183 |
| 7,793,251 B2* | 9/2010 | Goodnow et al. ............ | 716/117 |
| 8,494,798 B2* | 7/2013 | Kettaneh et al. .............. | 702/83 |
| 8,812,262 B2* | 8/2014 | Grittke et al. ................. | 702/182 |
| 2004/0230771 A1* | 11/2004 | Borgatti et al. ................ | 712/34 |
| 2006/0245454 A1* | 11/2006 | Balasubramanian et al. ............................ | 370/509 |
| 2006/0259260 A1* | 11/2006 | Frohlich et al. .............. | 702/100 |
| 2007/0152709 A1* | 7/2007 | Gerhart ......................... | 326/41 |
| 2008/0147206 A1* | 6/2008 | Zahrai et al. .................. | 700/19 |
| 2009/0037013 A1* | 2/2009 | Hendler et al. ............... | 700/103 |
| 2009/0119437 A1* | 5/2009 | Hilscher ....................... | 710/305 |
| 2009/0143019 A1* | 6/2009 | Shellhammer ............ | 455/67.11 |
| 2009/0292937 A1 | 11/2009 | Bakker | |
| 2010/0001760 A1* | 1/2010 | Balasubramanian et al. .. | 326/38 |
| 2010/0046539 A1* | 2/2010 | Frohna et al. ................. | 370/438 |
| 2010/0057237 A1* | 3/2010 | Kettaneh et al. ............. | 700/103 |
| 2010/0063604 A1* | 3/2010 | Kilian et al. .................... | 700/79 |
| 2010/0237923 A1* | 9/2010 | Terazawa et al. ............ | 327/261 |
| 2011/0043640 A1* | 2/2011 | Zinevich ....................... | 348/192 |
| 2011/0045857 A1* | 2/2011 | Ineichen et al. .............. | 455/507 |
| 2011/0116501 A1* | 5/2011 | Beaury et al. ................. | 370/389 |
| 2011/0191062 A1* | 8/2011 | Grittke et al. ................. | 702/182 |
| 2012/0185199 A1* | 7/2012 | Moran et al. .................. | 702/107 |

FOREIGN PATENT DOCUMENTS

| | | | |
|---|---|---|---|
| DE | 102007054672 | | 5/2009 |
| DE | 10 2010 002 346 A1 | | 4/2011 |
| WO | PCT/EP2008/065382 | * | 4/2008 |
| WO | WO 2008/046694 A1 | | 4/2008 |
| WO | WO 2009/155993 | | 12/2009 |

OTHER PUBLICATIONS

German Search Report.
English translation of IPR, Jan. 17, 2003, Geneva.
German Search Report (previously submitted), Jun. 6, 2011, Munich.

* cited by examiner

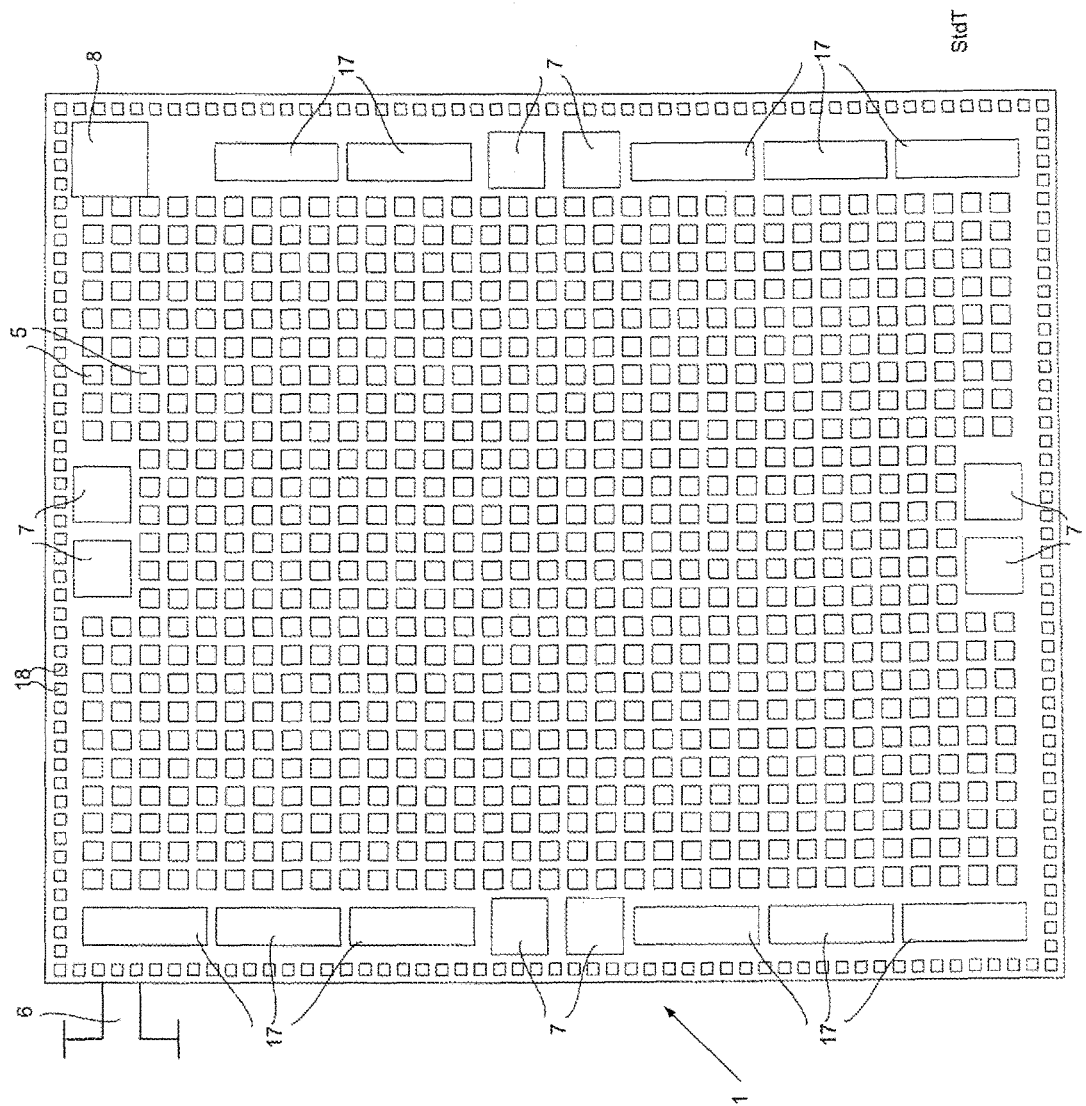

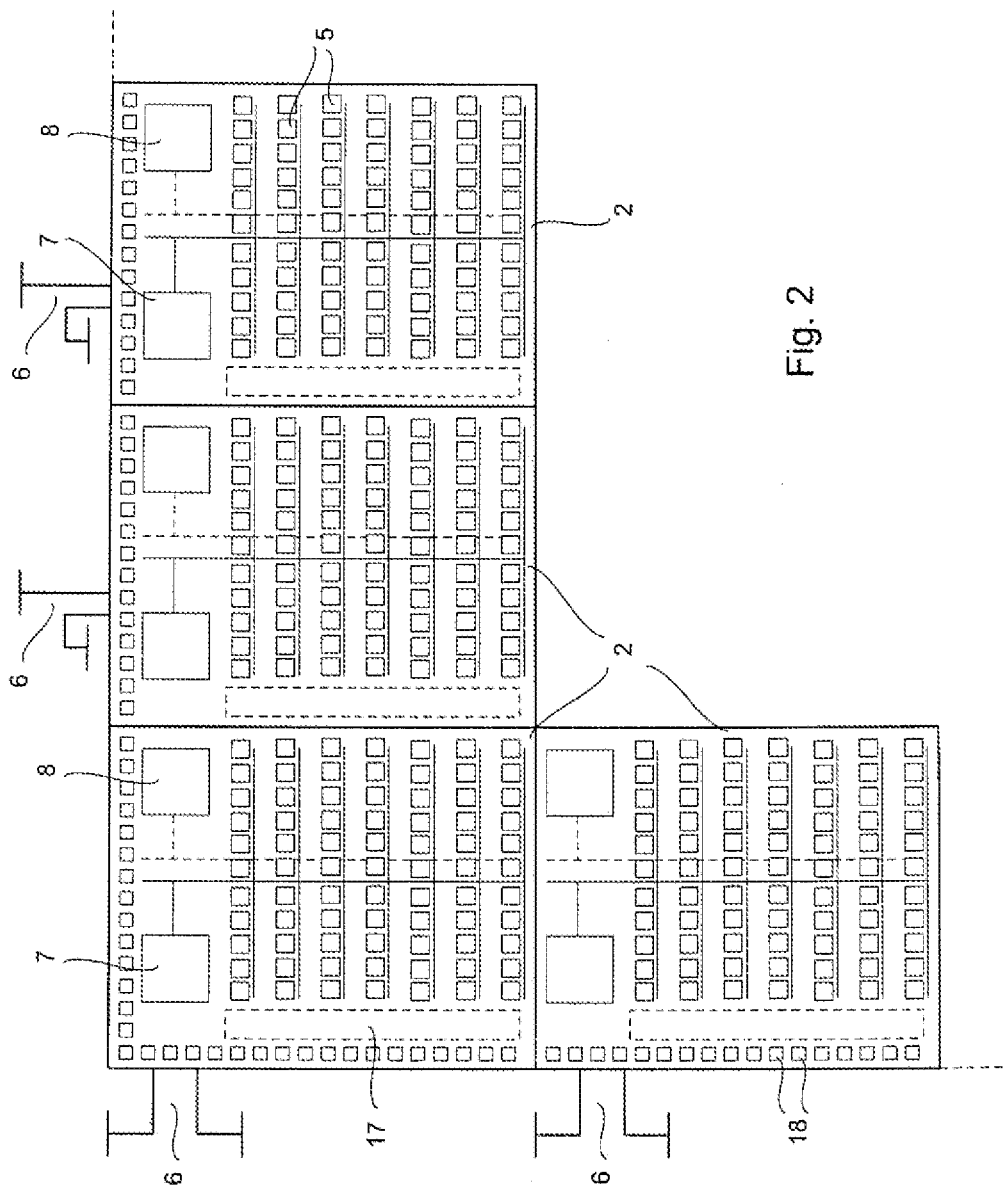

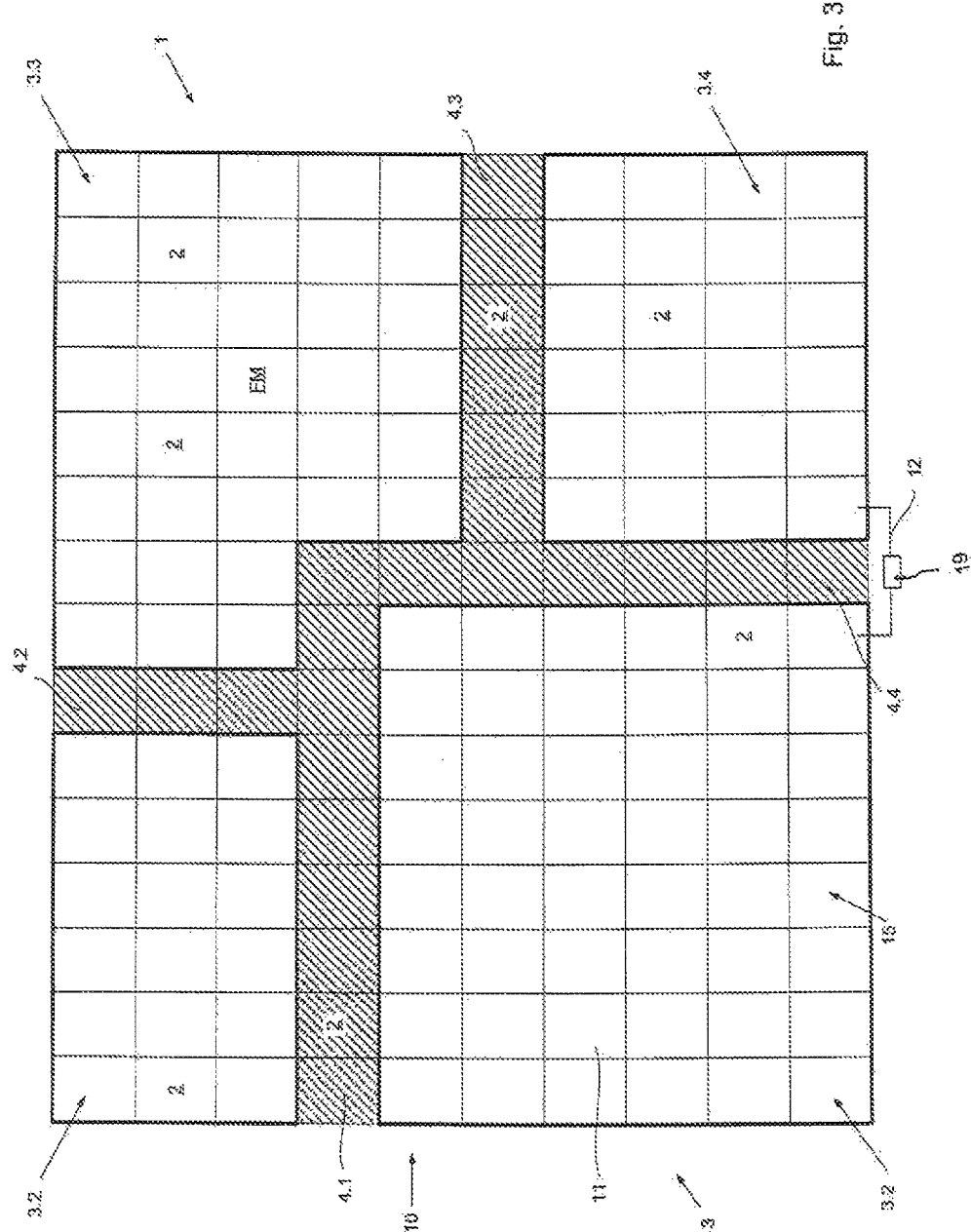

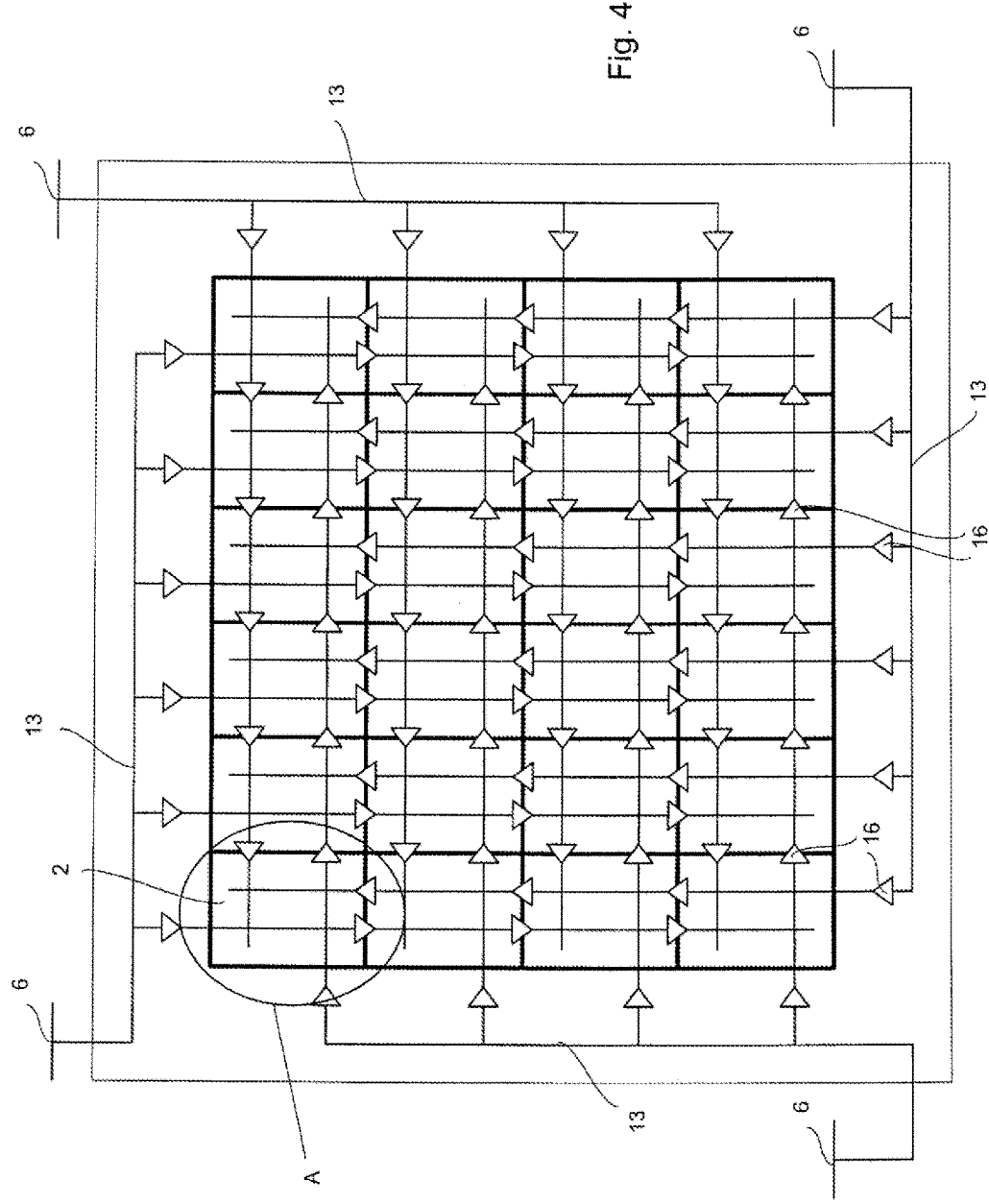

FIELD DEVICE FOR DETERMINING OR MONITORING A PHYSICAL OR CHEMICAL, PROCESS VARIABLE

CROSS-REFERENCE TO RELATED APPLICATION

This application is a Nonprovisional which claims the benefit of U.S. Provisional Application No. 61/344,438, filed on Jul. 22, 2010.

TECHNICAL FIELD

The invention relates to a field device for determining or monitoring a physical or chemical process, variable. Preferably, the field device is applied in automation technology, especially in process and manufacturing automation. In connection with this, reference is made to WO 2004/013585 A1, from which a solution is already known, which especially concerns an embodiment of a field device, which can be applied in a safety critical application in process automation. In principle, however, the invention is not limited to process and manufacturing automation, but, instead can also be applied in safety critical applications in the automobile sector, etc.

BACKGROUND DISCUSSION

In the following, automation technology is described in somewhat greater detail: Field devices, which serve for determining and monitoring process variables, are applied in automation technology, especially in process automation technology. Examples of such field devices are fill level measuring devices, flow measuring devices, analytical measuring devices, pressure and temperature measuring devices, humidity and conductivity measuring devices, density and viscosity measuring devices. The sensors of these field devices register the corresponding process variables, e.g. fill level, flow, pH value, substance concentration, pressure, temperature, humidity, conductivity, density or viscosity.

However, the term 'field devices' also encompasses actuators, e.g. valves or pumps, via which, for example, the flow of a liquid in a pipeline or the fill level in a container can be changed. A large number of such field devices are available from the firm, Endress+Hauser.

As a rule, field devices in modern automation technology plants as well as in the automobile sector are connected to a superordinated unit via communication networks such as HART Multidrop, point to point connection, Profibus, Foundation Fieldbus, CAN bus; the superordinated unit is referred to as a control system or superordinated control unit. This superordinated unit serves for control, diagnosis, visualization, monitoring, as well as for the start up and servicing of the field devices. Supplemental components necessary for the operation of fieldbus systems, directly connected to a fieldbus and serving especially for communication with the superordinated units, are likewise frequently referred to as field devices. These supplemental components include e.g. remote I/Os, gateways, linking devices, controllers, wireless adapters, etc. These also fall under the terminology, 'field devices'.

The software fraction of field devices is steadily increasing. The advantage in the use of intelligent field devices (smart field devices) controlled by microcontrollers is that a large number of different functionalities can be implemented in a field device using application specific, software programs; program changes can also be made relatively simply.

On the other hand, the high flexibility of program controlled, field devices is countered by having a relatively low processing speed and therewith a correspondingly low measuring rate as a result of the sequential progression through the program.

In order to increase the processing speed, ASICs—Application Specific Integrated Circuits—are used in field devices, when it is economically justifiable. Through an application specific configuration, these chips can process data and signals significantly faster than a software program. Consequently, ASICs are especially excellently suitable for computationally intensive applications.

Disadvantageous in the case of ASICs is that their functionality is fixed after creation. Subsequent change of the functionality of these chips is not readily possible. Furthermore, the use of ASICs pays off only with relatively large piece numbers, since the developmental effort and the costs connected therewith are high.

A configurable field device, in which a reconfigurable logic chip in the form of an FPGA (Field-Programmable Gate Array) is provided, in order to avoid the drawback of fixed functionality, is known from WO 03/098154 A1. In this known solution, the logic chip is configured with at least one microcontroller, which is also referred to as an embedded controller, at system startup. After the configuration is finished, the required software is loaded in the microcontroller. The reconfigurable logic chip here required must make use of sufficient resources, namely logic, wiring and memory resources, in order to fulfill the desired functionalities. Logic chips with many resources require much energy, which, in turn, makes its use in automation only limitedly possible from a functional point of view. A disadvantage in the use of logic chips with few resources and, thus, with lower energy consumption is the occasionally considerable limitation in the functionality of the corresponding field device.

Depending on application, field devices must satisfy the most varied of safety requirements. In order to satisfy relevant safety requirements, e.g. the SIL-standard 'security integrity level', which plays a large role in process automation, the functionality of the field devices must, moreover, be redundantly and/or diversely designed.

Redundancy means increased safety through the doubled or multiple designing of all safety relevant, hardware and software components. Diversity means that the hardware components, such as e.g. a microprocessor or an A/D converter, located in the different measuring paths come from different manufacturers and/or that they are of different types. In the case of software components, diversity requires that software stored in the microprocessors originate from different sources, e.g. different manufacturers or programmers. Through all these measures, it should be assured that a safety critical failure of the field device as well as the occurrence of simultaneously arising systematic errors in the measured value are excluded with high probability. Supplementally, it is also known to design individual essential hardware and software components of the evaluating circuit redundantly and/or diversely. The redundant and diverse design of individual hardware and software components can further increase the degree of safety.

An example of a safety relevant application is monitoring fill level in a tank, in which a burnable, explosive liquid, or also a non combustible liquid that is endangering to the environment, is stored. Here it must be assured that the supply of liquid to the tank is immediately interrupted as soon as a maximum reliable fill level is achieved. This, in turn, requires that the measuring device detects the fill level with high reliability and works faultlessly.

A field device is known from WO 2009/062954 A1 that has a sensor, which works according to a defined measuring principle, and a control/evaluation unit, which conditions and evaluates the measurement data delivered by the sensor along at least two equal measuring paths as a function of a safety standard required in the respective safety critical application. The control/evaluation unit is at least partially embodied as a reconfigurable logic chip with a plurality of partially dynamically reconfigurable function modules. The control/evaluation unit configures the function modules in the measuring paths as a function of the defined safety critical application in such a manner that the field device is correspondingly designed to fulfill the required safety standard.

Problematic in the case of the known embodiment is that a malfunction, e.g. a short circuit or a temperature change, in one section automatically influences other sections. There is crosstalk to other sections, so that the field device can deliver defective measurement results and no longer works reliably. This presents a high risk, especially in safety critical applications, which is not acceptable.

The not pre-published DE 10 2010 002 346.9, filed on Feb. 25, 2010, describes a field device, in which the control/evaluation unit is realized on a single FPGA chip. A standard FPGA chip is utilized. In such case, at least a first section and a second section are provided on the FPGA chip. In each section, a digital measuring path is partially dynamically reconfigurable; the measuring path comprises a plurality of software based and/or hardware based function modules. The individual sections are isolated from one another by permanently configured spacing regions or forbidden regions, wherein the spacing regions are embodied so that a temperature and/or a voltage change in one of the sections does not influence the other section or the other sections and that no connection arises between the sections in the case of malfunction. The control/evaluation unit partially dynamically reconfigures the function modules in the measuring paths as a function of each defined safety critical application in such a manner that the field device fulfills the required safety standard. 'Partially dynamically reconfigurable' means that the function modules of the FPGA in the corresponding measuring path are reconfigured during run time, i.e. dynamically. This is especially important when a malfunction occurs. One such malfunction is brought about, for example, by incoming gamma or cosmic radiation, thus high energy radiation, which changes or shuts down the functioning of one or a plurality of logic blocks or logic components or other resources.

SUMMARY OF THE INVENTION

An object of the invention is to provide a highly flexible field device for use in safety critical applications.

The object is achieved by a field device comprising: a sensor, which works according to a defined measuring principle; and a control/evaluation unit. The control/evaluation unit is realized as a partially dynamically reconfigurable FPGA component constructed of a plurality of FPGA block units, wherein each FPGA block unit comprises a plurality of logic blocks and wherein global resources or global function blocks are associated with each FPGA block unit or with a defined group of FPGA block units. At least a first section and a second section are provided on the FPGA component; the sections comprise FPGA block units and corresponding global resources or global function blocks. In each section a digital measuring path comprising a plurality of software based and/or hardware based function modules, is partially dynamically reconfigurable. The global resources or global function blocks are DCMs, i.e. Digital Clock Managers, global wiring, clock or configuration resources and/or inputs/outputs. Furthermore, the global resources can also be memory chips (RAMs) and multipliers. The resources named last are not absolutely necessary.

In an advantageous embodiment of the field device of the invention, it is provided that wiring for the transmission of data and/or signals is provided between the FPGA block units. In this way, it is possible to connect a number of block units suitably with one another, whereby more complex functions are implementable.

An advantageous embodiment provides that the control/evaluation unit partially dynamically reconfigures the FPGA block units, preferably through function modules in the measuring paths or in the sections, as a function of a defined safety critical application, so that the field device fulfills a required safety standard. For example, the safety standard is the standard IEC61508 (Edition 2).

In order to achieve a defined isolation of the sections, the individual sections are isolated from one another by spacing regions, wherein the spacing regions comprise FPGA block units with corresponding global resources or global function blocks. Originally, an FPGA component comprises a plurality of FPGA block units, which are then connected together to build sections. The sections on the FPGA component form islands insulated from one another, whereby no mutual influencing occurs.

Preferably, the spacing regions are so embodied that a potential isolation between the sections is achieved in such a manner that a temperature and/or a voltage change in one of the sections has no influence on a neighboring section or the neighboring sections and that no connection between the sections occurs in the case of a malfunction. In such case, the dimensions of the spacing regions used for potential isolation is dependent on the dimensions of the FPGA block units, wherein a spacing region has at least the width of an FPGA block unit. In any case, the width of the spacing regions is so selected that short circuiting or crosstalk between sections is excluded. Furthermore, the spacing regions serve for thermal decoupling of the sections. The granularity, i.e. the size of the islands, is lastly a compromise between overhead, wherein especially the configuration resources are understood to be among this, and the degree of flexibility. Flexibility means that the user can freely define the size of the groups of block units, or sections, during the developmental phase and, by paying attention to certain rules, also during operation of the field device.

An advantageous further development of the field device of the invention provides that the logic blocks, the global resources or global function blocks, as well as the corresponding wiring arranged in each spacing region are connected to ground or are blocked externally by turning off the electrical current supply.

As a function of the safety regulations present, the measuring paths having the partially dynamically reconfigurable function modules are designed redundantly, diversely, or redundantly and diversely.

Furthermore, it is provided that associated with the control/evaluation unit is a voter or microcontroller, which is likewise isolated from the neighboring measuring paths by spacing regions and which compares with each other the measurement data made available by, or in, the measuring paths and corresponding to one another, and, in the case of a deviation, generates a warning and/or an error report. Preferably, the voter or microcontroller is arranged in an FPGA block unit.

In an advantageous form of embodiment of the field device of the invention, it is provided that the voter or microcontroller partially dynamically reconfigures the function modules for an odd number of redundant and or diverse measuring paths serially or in parallel, wherein the voter or microcontroller compares the measurement data made available by or in the measuring paths with one another, and wherein the voter or microcontroller generates a warning report that a defined measuring path is delivering defective data when measurement data made available by the defined measuring path deviates from the measurement data of the remaining measuring paths. In the case of a malfunction, it is possible to determine in which measuring path the error occurred with this embodiment.

Moreover, it is provided that a static region, isolated from neighboring sections by spacing regions is provided on a selected section of the FPGA; at least one function module, in which the control program for the configuration of the function modules to be dynamically configured in the individual sections runs, is permanently configured in the static region.

An advantageous embodiment of the field device of the invention provides communication lines, which are arranged outside of the FPGA component. Furthermore, at least one limiting apparatus to limit voltage and/or electrical current between the sections is provided in the individual communication lines.

It is seen as especially advantageous in connection with the present invention when at least some of the global resources or global function blocks are associated with a plurality of FPGA block units.

Thus, a global resource or a global function block for electrical current/voltage supply is preferably associated with a plurality of FPGA block units. The corresponding supply lines are dividable as much as desired by interposing electrical or electronic isolating elements.

Moreover, it is provided that the control/evaluation unit partially dynamically reconfigures the FPGA block units in the sections or in the measuring paths and the corresponding spacing regions as a function of the respective application.

Furthermore, in the case of a safety critical application, it is provided that the control/evaluation unit performs the partially dynamic reconfiguration such that the individual sections are isolated from one another at all times by at least one spacing region.

BRIEF DESCRIPTION OF THE DRAWINGS

The invention will now be explained in greater detail based on the appended drawing, the figures of which show as follows:

FIG. 1 is a representation of an FPGA component known from the state of the art, FIG. 3 is by way of example, a particular embodiment of the FPGA component of the invention for a safety critical application, FIG. 4 is a block diagram for wiring the supply voltage.

DETAILED DISCUSSION IN CONJUNCTION WITH THE DRAWINGS

Figure 2A:
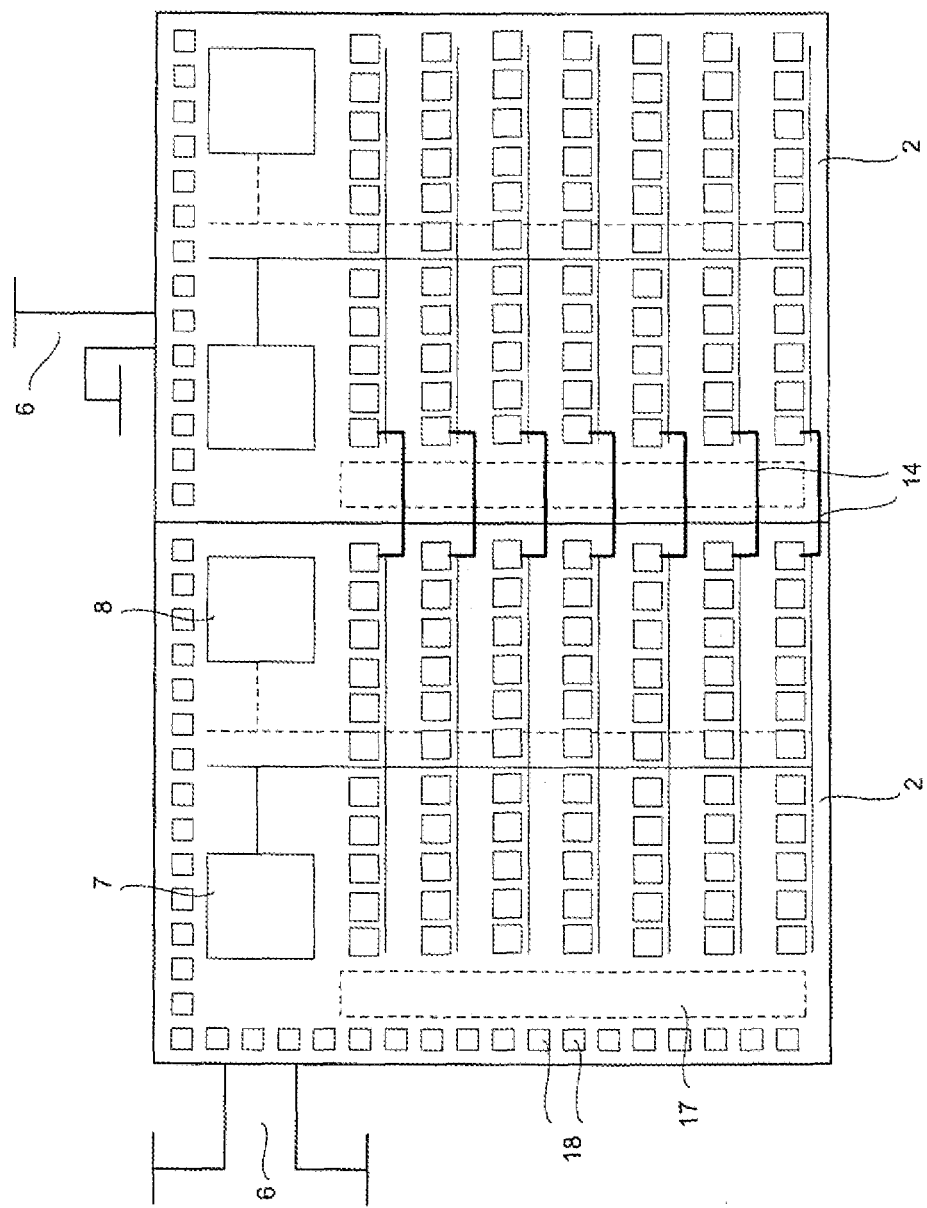
FIG. 2 is a representation of an embodiment of the FPGA component of the invention, FIG. 2a a detailed view of the FPGA shown in FIG. 2, depicting the connection between two individual blocks.

FIG. 1 shows a representation of an FPGA component 1 known from the state of the art; the FPGA component is embodied to be partially dynamically reconfigurable. A plurality of reconfigurable logic blocks 5 are arranged on the component 1. Furthermore, global resources, such as a central voltage supply 6, a number of clock resources 7, so called Digital Clock Managers, and configuration resources 8 are to be found on the FPGA component 1. Furthermore, resources such as multipliers and/or memory elements 17 and inputs/outputs 18 are arranged on the FPGA component 1.

FIG. 2 shows a representation of an embodiment of the FPGA component 1 of the invention. While the logic blocks 5 are essentially homogeneously arranged on the FPGA component 1 shown in FIG. 1, the FPGA component 1 of the invention has a plurality of FPGA block units 2, in which the logic blocks 5 are arranged in islands largely separated from one another. The block units 2 each have a separate voltage supply 6, dedicated clock resources 7, such as DCM, global connecting lines, dedicated configuration resources 8, such as JTAG, configuration lines and dedicated inputs/outputs 18. These resources are referred to as global resources 6, 7, 8 in connection with the invention. Additionally, optionally, there are dedicated, less important global resources, such as multipliers/memory elements 17, etc. As already described above, the global resources 6, 7, 8 can also be associated with a group of block units 2. Such an embodiment can make sense, depending on application.

FIG. 2a shows multiple interconnects in the form of wiring 14 between two of the individual blocks 2 of FIG. 2.

FIG. 3 shows, by way of example, a concrete embodiment of the FPGA component 1 of the invention for a safety critical application. In the case illustrated, the FPGA component 1 is divided into four sections 3.1, 3.2, 3.3, 3.4. Section 3.1 is embodied as a static region 15. Preferably the microcontroller or voter 11 is configured permanently here. The individual redundant and/or diverse measuring paths MP1, MP2, MP3 are partially dynamically reconfigured in sections 3.2, 3.3, 3.4. In such case, partially means that only individual function modules FM in one of the measuring paths MP1, MP2, MP3 can be reconfigured.

The individual block units 2 are isolated from one another by spacing regions 4.1, 4.2, 4.3, 4.4. The spacing regions 4.1, 4.2 . . . are so embodied that a potential isolation between the sections 3.2, 3.3 . . . is achieved. This is done in such a manner that a temperature and/or a voltage change in one of the sections MP1, MP2 . . . has no influence on a neighboring section or neighboring sections and that no connection between the sections MP1, MP2, MP3 arises in the case of malfunction. Especially, the dimensions of the spacing regions 4.1, 4.2 . . . installed for potential isolation are dependent on the dimensions of the FPGA block units 2. In FIG. 3, the width of the spacing regions 4.1, 4.2 . . . corresponds to each individual FPGA block unit 2. As described in FIG. 2, each block unit 2 or a group of block units 2 possesses global resources 6, 7, 8. In order to achieve a safe isolation between the sections 3.1, 3.2 . . . , the spacing regions 4.1, 4.2 . . . in the region of the block units 2 are insulated, or supplied, from the voltage supply 6 and connected to ground or correspondingly configured. In connection with the field device of the invention, it is possible to reconfigure or partially reconfigure individual measuring paths MP1, MP2 . . . during operation of the field device. In such case, however, in the case of use in a safety critical application, it must be heeded that the safety separation, e.g. the corresponding spacing regions 4.1, 4.2 . . . are always configured first in the case of a change of the dimensions of a measuring path MP1, MP2 . . . .

Furthermore the communication between the FPGA sections 3.1, 3.2 . . . or the measuring paths MP1, MP2 . . . occurs externally and is protected by resistors 19.

As already mentioned above, it is possible to associate the global resources 6, 7, 8 with a variable number of block units 2, depending on application. This is made possible in that at least one global resource 6, 7, 8, or one global function block, is present for the supply of electrical current/voltage and/or a clock signal and/or for the configuration of a plurality of FPGA block units 2. The corresponding supply lines (and/or clock lines and/or configuration lines—the latter are not separately shown in FIG. 4 and FIG. 4a) are dividable as much as desired by interposing electrical or electronic isolating elements 16. The isolating elements 16 are, for example, transistors.

Figure 4A:
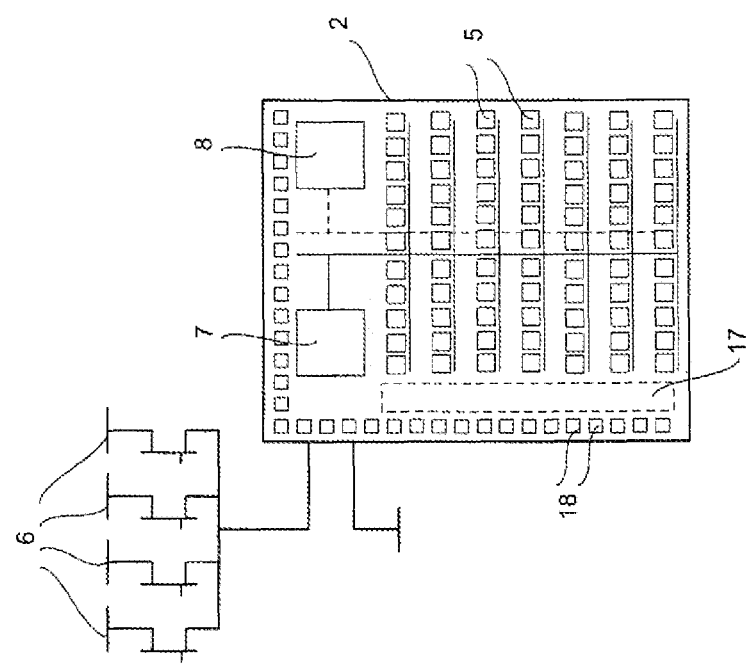
FIG. 4a is section A from FIG. 4.

Shown in FIG. 4 is a block diagram for the wiring 14 of the supply voltage 6. The supply lines 13 are not allowed to cross and, consequently, in given cases, are arranged in different planes of the FPGA component 1. FIG. 4a shows an enlargement of section A in FIG. 4. As there are, supply lines 13 for the supply voltage 6, so there are separate lines for the additional global resources 7, 8, which can likewise be switched in and out individually or in groups with isolating elements 16, to the extent desired.

The invention claimed is:

1. A field device for determining or monitoring a physical or chemical, process variable, comprising:
   a sensor, which works according to a defined measuring principle; and
   a control/evaluation unit, wherein the control/evaluation unit is realized on a partially dynamically reconfigurable FPGA (Field Programmable Gate Array) component, which is constructed from a plurality of FPGA block units;
   wherein each FPGA block unit comprises a plurality of logic blocks and wherein global resources or global function blocks are associated with each FPGA block unit or groups of FPGA block units, wherein:
   at least a first section and a second section are provided on said FPGA component, which sections comprise FPGA block units and corresponding global resources or global function blocks; and
   in each section a digital measuring path comprising a plurality of software based and/or hardware based, function modules, is partially dynamically reconfigurable;
   wherein said individual sections are isolated from one another by spacing regions for a potential isolation between the individual sections; wherein the spacing regions comprise FPGA block units with corresponding global resources or global function blocks, and
   wherein the dimensions of the spacing regions, installed for potential isolation, are dependent on the dimensions of the FPGA block units and have at least the width of an FPGA block unit.

2. The field devices as claimed in claim 1, wherein:
   wiring is provided for the transmission of data and/or signals between said FPGA block units.

3. The field device as claimed in claim 1, wherein:
   said control/evaluation unit partially dynamically reconfigures said function modules in the measuring paths, or in the sections as a function of a defined safety critical application, so that the field device fulfills a required safety standard.

4. The field device as claimed in claim 2, wherein:
   said logic blocks, said global resources or said global function blocks as well as said corresponding wiring arranged in each spacing region are connected to ground or are blocked externally by the turning off of the electrical current supply.

5. The field device as claimed in claim 1, wherein:
   said measuring paths with the partially dynamically reconfigurable function modules are designed redundantly, diversely, or redundantly and diversely.

6. The field device as claimed in claim 1, wherein:
   associated with said control/evaluation unit is a voter or microcontroller, which is likewise isolated from the neighboring measuring paths by spacing regions;
   said voter or microcontroller compares measurement data made available by or in said measuring paths and corresponding to one another with each another and generates a warning or error report in the case of a deviation.

7. The field device as claimed in claim 1, wherein:
   said voter or microcontroller partially dynamically reconfigures said function modules for an odd number of redundant and or diverse measuring paths serially or in parallel;
   said voter or microcontroller compares the measurement data made available by or in said measuring paths with one another; and
   said voter or microcontroller generates a warning report that a defined measuring path is delivering defective data when measurement data made available by said defined measuring path deviates from measurement data of the remaining measuring paths.

8. The field device as claimed in claim 1, wherein:
   a static region, which is isolated from the neighboring sections by spacing regions, is provided on a selected section of said FPGA; and
   at least one function module, in which the control program for configuring said function modules to be dynamically configured in said individual sections runs, is permanently configured in said static region.

9. The field device as claimed in claim 1, wherein:
   communication lines are provided, which are arranged between the sections outside of said FPGA component.

10. The field device as claimed in claim 9, further comprising:
    at least one limiting apparatus in the individual communication lines for limiting voltage and/or electrical current between said sections.

11. The field device as claimed in claim 1, wherein:
    at least some of the global resources or global function blocks are associated with a plurality of said FPGA block units.

12. The field device as claimed in claim 11, wherein:
    at least one global resource or global function block for electrical current/voltage supply and/or for the clock signal and/or for configuration is associated with a plurality of said FPGA block units; and
    the corresponding supply lines and/or clock lines and/or configuration lines are dividable as much as desired by interposing electrical or electronic isolating elements.

13. The field device as claimed in claim 1, wherein:
    said control/evaluation unit partially dynamically reconfigures said FPGA block units in said sections or in said measuring paths and the corresponding spacing regions as a function of the respective application.

14. The field device as claimed in claim 13, wherein:

in the case a safety critical application, said control/evaluation unit performs the partially dynamic reconfiguration such that the individual sections are isolated from one another at all times by at least one spacing region.

\* \* \* \* \*